United States Patent
Mitchell

(10) Patent No.: US 9,891,107 B1
(45) Date of Patent: Feb. 13, 2018

(54) COMBINED TEMPORAL/HYPERSPECTRAL IMAGER

(71) Applicant: Thomas A. Mitchell, Nazareth, PA (US)

(72) Inventor: Thomas A. Mitchell, Nazareth, PA (US)

(73) Assignee: WAVEFRONT RESEARCH, INC., Bethlehem, PA (US)

( * ) Notice: Subject to any disclaimer, the term of this patent is extended or adjusted under 35 U.S.C. 154(b) by 559 days.

(21) Appl. No.: 14/216,058

(22) Filed: Mar. 17, 2014

Related U.S. Application Data

(60) Provisional application No. 61/793,978, filed on Mar. 15, 2013.

(51) Int. Cl.
| | |
|---|---|
| *G01J 3/28* | (2006.01) |
| *G02B 5/18* | (2006.01) |
| *G02B 27/30* | (2006.01) |
| *G01J 3/02* | (2006.01) |
| *G01J 3/04* | (2006.01) |

(52) U.S. Cl.
CPC .......... *G01J 3/2823* (2013.01); *G01J 3/0208* (2013.01); *G01J 3/04* (2013.01); *G02B 5/1842* (2013.01); *G02B 27/30* (2013.01); *G02B 2005/1804* (2013.01)

(58) Field of Classification Search
CPC .......... G01J 3/2823; G01J 3/18; G01J 3/0208; G01J 2003/2826
See application file for complete search history.

(56) References Cited

U.S. PATENT DOCUMENTS

| | | | | |
|---|---|---|---|---|
| 6,029,115 A * | 2/2000 | Tracy | ......................... | G01J 3/28 356/319 |
| 6,747,738 B2 * | 6/2004 | Knapp | .................... | H04N 9/045 348/E9.01 |
| 7,092,088 B2 * | 8/2006 | Schau | .................... | G01J 3/2823 356/328 |
| 8,860,942 B1 * | 10/2014 | Ewing | .................... | G01J 3/2823 356/419 |
| 2004/0156048 A1 * | 8/2004 | Mitchell | .................... | G01J 3/02 356/305 |
| 2004/0227940 A1 * | 11/2004 | Mitchell | .................... | G01J 3/18 356/328 |
| 2012/0105846 A1 * | 5/2012 | Funayama | ................ | G01J 3/02 356/326 |

* cited by examiner

*Primary Examiner* — Michael A Lyons
*Assistant Examiner* — Maurice Smith
(74) *Attorney, Agent, or Firm* — Burns & Levinson LLP; Orlando Lopez

(57) ABSTRACT

The present disclosure provides an optical imaging system that defines an optical path. In an aspect, the optical imaging system includes a first optical sub-system configured to substantially image, at a focus plane, electromagnetic radiation emanating from an object plane, a slit element at the focus plane to extract a line image from the electromagnetic radiation, a second optical sub-system configured to collimate, at a center plane, the electromagnetic radiation from the slit element, a dispersive element at the center plane with variable dispersive properties, a third optical sub-system configured to image the collimated electromagnetic radiation from the center plane to an image plane, and a detecting element at the image plane. In one example, the slit element is mechanically movable into and out of the optical path.

7 Claims, 3 Drawing Sheets

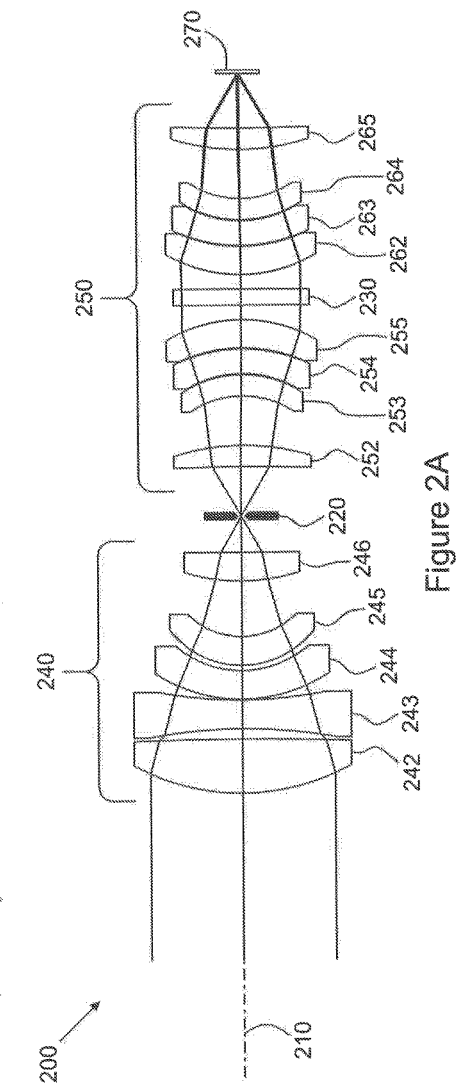
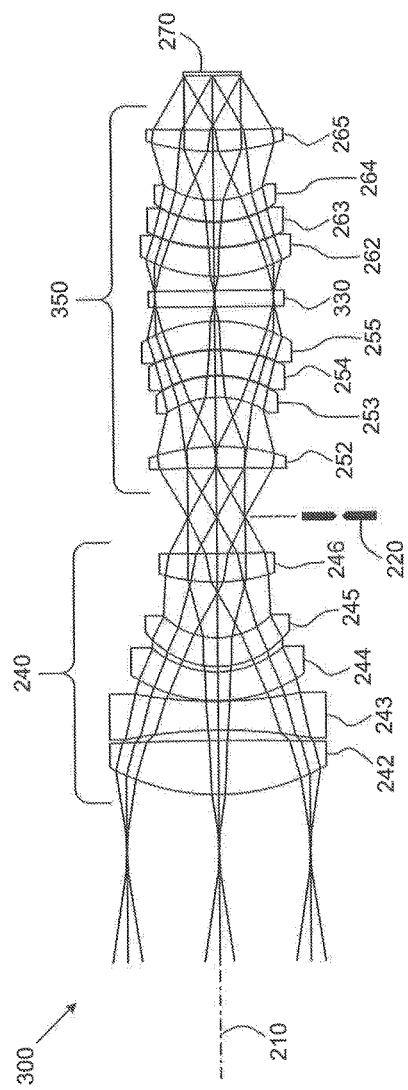

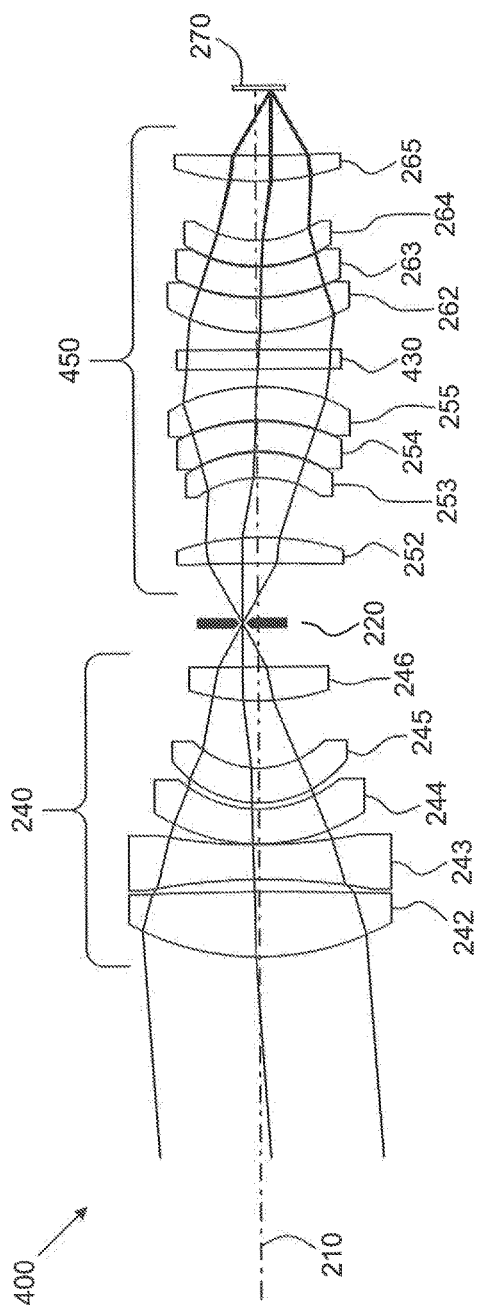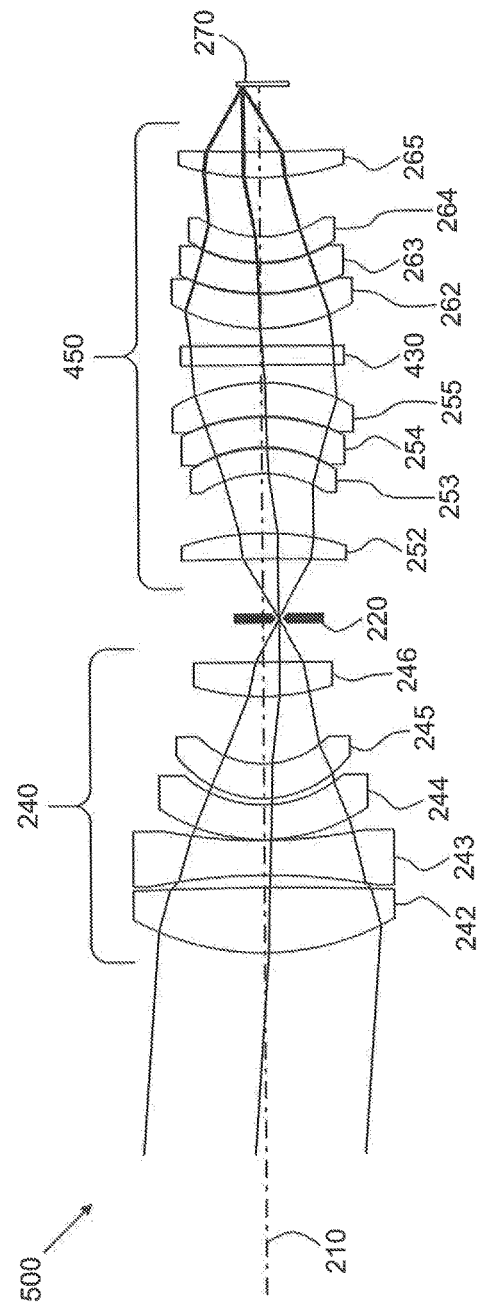

COMBINED TEMPORAL/HYPERSPECTRAL IMAGER

CROSS-REFERENCED TO RELATED APPLICATIONS

This application claims priority to U.S. Provisional Application No. 61/793,978, filed on Mar. 15, 2013, which is incorporated by reference herein in its entirety and for all purposes.

STATEMENT REGARDING FEDERALLY SPONSORED RESEARCH OR DEVELOPMENT

This invention was made with U.S. Government support from the U.S. Army under Contracts W15P7T-07-C-P203 and W15P7T-08-C-P212. The U.S. Government may have certain rights in the invention.

BACKGROUND

These teachings relate generally to imagers and spectrometers. More particularly, these teachings relate to temporal or hyperspectral imagers and spectrometers.

In certain applications, it is often desirable to simultaneously capture temporal two-dimensional imagery of a scene as well as scanning hyperspectral imagery of the same scene. This is typically accomplished through the use of separate imaging and hyperspectral imaging sensors, where the data is later co-registered and merged.

There is a need for optical systems that can provide both two-dimensional temporal imaging and hyperspectral imaging.

It is also often desirable for reasons such as, for example, illumination conditions, spectral or spatial feature sizes of the desired target, or data collection rates, to have the capability to adjust the spatial or spectral resolution of a spectrometer.

SUMMARY

Various embodiments of the present teachings provide an imaging optical system with the capability to readily switch between a temporal two-dimensional spatial imaging mode and a hyperspectral imaging mode.

In one aspect, the present teachings provide an optical imaging system defining an optical path. The optical imaging system comprises a first optical sub-system having at least one optical element, said first optical sub-system being configured to substantially image, at a focus plane, electromagnetic radiation emanating from an object plane; at least one slit element substantially located at said focus plane, the at least one slit element being configured to extract a line image from the electromagnetic radiation; a second optical sub-system having at least one optical element, said second optical sub-system being configured to substantially collimate, at a center plane, the electromagnetic radiation from said at least one slit element; at least one dispersive element substantially located at the center plane, said at least one dispersive element comprises variable dispersive properties; a third optical sub-system having at least one optical element, said third optical sub-system being configured to image the substantially collimated electromagnetic radiation from the center plane to an image plane; and at least one detecting element located substantially at the image plane; wherein said at least one slit element is movable into and out of the optical path.

In one embodiment, said at least one dispersive element comprises a pair of counter-rotating transmission gratings, and said at least one dispersive element is configured to provide substantially zero dispersion.

In one embodiment, said at least one dispersive element is movable into and out of the optical path.

In one embodiment, said at least one detecting element is substantially centered on the optical path of said third optical sub-system.

In another aspect, the present teachings provide an optical imaging method. The method comprises imaging electromagnetic radiation from an object plane to an image plane through a slit element of an optical imaging system defining an optical axis, the slit element being substantially located at a focus plane between the object plane and the image plane; mechanically translating the slit element along a direction perpendicular to the optical axis so as to scan the object plan; and detecting the electromagnetic radiation on the image plane.

In one embodiment, imaging the electromagnetic radiation comprises focusing the electromagnetic radiation from the object plane to the slit element at the focus plane; extracting a line image from the electromagnetic radiation using the slit element at the focus plane; collimating the line image to a dispersive element at a center plane between the focus plane and the image plane; and focusing the collimated line image from the center plane to the image plane.

In one embodiment, imaging the electromagnetic radiation further comprises modifying dispersive properties of the dispersive element, and modifying the dispersive properties comprises rotating a first transmission grating of the dispersive element relative to a second transmission grating of the dispersive element.

In one embodiment, mechanically translating the slit element comprises stepwise moving the slit element along a direction perpendicular to the optical axis.

For a better understanding of the present invention, together with other and further objects thereof, reference is made to the accompanying drawings and detailed description.

BRIEF DESCRIPTION OF THE DRAWINGS

FIGS. 2A-2B are schematic views of an optical imaging system, taken along its optical axis, in accordance with an embodiment of the present disclosure; and FIGS. 3A-3B are schematic views of an optical imaging system, taken along its optical axis, in accordance with another embodiment of the present disclosure.

DETAILED DESCRIPTION

The following detailed description is of the best currently contemplated modes of carrying out these teachings. The description is not to be taken in a limiting sense, but is made merely for the purpose of illustrating the general principles of these teachings, since the scope of these teachings is best defined by the appended claims. Although the teachings have been described with respect to various embodiments, it should be realized these teachings are also capable of a wide variety of further and other embodiments within the spirit and scope of the appended claims.

Embodiments of the optical system of these teachings which have the capability to readily switch between a temporal two-dimensional spatial imaging mode and a hyperspectral imaging mode, and also embodiments of the optical system of these teachings including a spectrometer with a compact scanning method are disclosed hereinbelow.

Figure 1A:
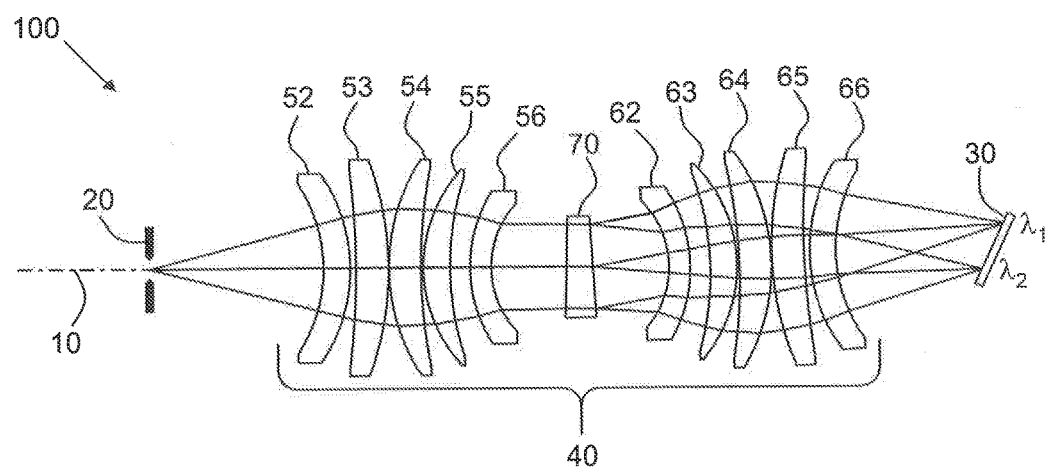
FIGS. 1A-1B are schematic views of previously presented a compact refractive relay spectrometer, taken along its optical axis in the plane parallel to and perpendicular to the direction of dispersion, respectively.

Reference is made to FIG. 1A, which is a schematic view of a refractive relay spectrometer 100 of the type described in U.S. Pat. No. 7,061,611, which is incorporated here by reference in its entirety for all purposes, taken along its optical axis 10 in the plane parallel to the direction of dispersion. In operation, electromagnetic radiation (typically in the ultraviolet, visible, and/or infrared bands, hereinafter referred to generally as light) emitted or reflected by a given object (either real or virtual, hereinafter referred to generally as the source) located at the object plane (e.g., a slit, such as but not limited to a mechanical opening in an otherwise opaque substrate, an etched line in an otherwise opaque coating, a reflective line feature, or other method of extracting a line image, hereinafter referred to generally as a slit element 20) is incident on an optical relay imager 40. In this embodiment, optical relay imager 40 comprises refractive elements 52, 53, 54, 55, 56, 62, 63, 64, 65, and 66 and a dispersing element 70. In one embodiment, dispersing element 70 is a transmission diffraction grating. In other embodiments, dispersing element 70 may be any method of angularly separating light energy according to its wavelength, hereinafter referred to generally as a dispersing element. The optical relay imager 40 is capable of substantially receiving a portion of the light emanating from the slit 20 and substantially reimaging the light from the slit 20 and dispersing it according to its wavelength and substantially focusing the light to a focus position (hereinafter also referred to as an image plane 30), which may comprise a CCD array, phosphorescent screen, photographic film, microbolometer array, or other means of detecting light.

Figure 1B:
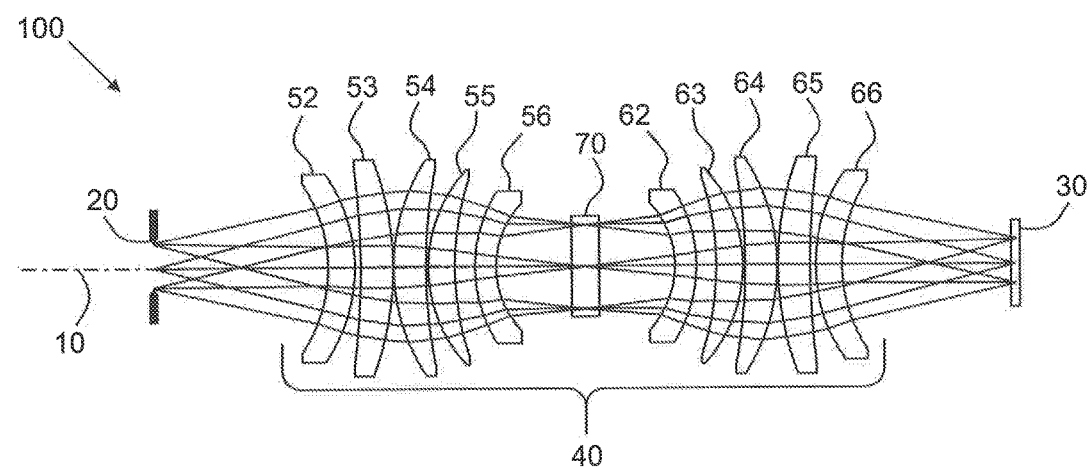

Reference is made to FIG. 1B, which is a schematic view of the refractive relay spectrometer 100 illustrated in FIG. 1A, taken along its optical axis in the plane perpendicular to the direction of dispersion. In operation, light emanating from the slit element 20 is imaged by the optical relay imager 40 onto the image plane 30 with, but not limited to, unity magnification.

In certain cases, it is often desirable to simultaneously capture temporal two-dimensional imagery of a scene as well as scanning hyperspectral imagery of the same scene. The imaging optical systems described herein provide the capability to capture both temporal and hyperspectral imagery with a single sensor. It is also often desirable for reasons such as, but not limited to, illumination conditions, spectral or spatial feature sizes of the desired target, or data collection rates, to have the capability to adjust the spatial or spectral resolution of a spectrometer. Spectrometer designs having the dynamic system resolution of the present teachings can provide this capability.

FIG. 2A illustrates an optical imaging system 200, taken along its optical axis 210 in the plane parallel to the direction of dispersion, in accordance with an embodiment of the present teachings. The system 200 contains a moveable slit 220 and a variable dispersion dispersing element 230, such as, but not limited to, a pair of transmission gratings, that is capable of changing its combined dispersive properties to be a substantially non-zero value or a substantially zero value. This can be accomplished by, for example, changing the relative orientation of the pair of transmission gratings of dispersing element 230 with respect to one another by rotating one or both gratings such that their dispersions add either constructively or destructively with each other. A rotational mechanism, such as but not limited to, a pair of counter rotating gears, can be used to orient the transmission gratings for the maximum dispersion configuration or the zero dispersion configuration or any dispersion configuration in between. Alternatively, the dispersive element can be mechanically moved out of or otherwise removed from the optical path to eliminate its dispersion in the optical system.

In the embodiment illustrated in FIG. 2A, the slit 220 remains in the optical path while the variable dispersing element 230 is placed in its dispersing mode, which allows the system to operate in its hyperspectral mode. In operation, light emitted or reflected by a source located at the object plane, is incident on an imager 240. In this embodiment, imager 240 comprises refractive elements 242, 243, 244, 245, and 246, and is capable of substantially receiving a portion of the light from the source and substantially focusing the light onto the slit aperture 220. In this embodiment, slit aperture 220 is capable of substantially receiving the light from the imager 240 and substantially capable of extracting and transmitting a line image.

Light transmitted by the slit element 220 is incident on an optical relay imager 250. In this embodiment, optical relay imager 250 comprises refractive elements 252, 253, 254, 255, 262, 263, 264, and 265, and the variable dispersing element 230. In one embodiment, variable dispersing element 230 may be a pair of rotating transmission diffraction gratings, whose combined dispersive properties are substantially non-zero. The optical relay imager 250 is capable of substantially receiving a portion of the light emanating from the slit 220 and substantially reimaging the light from the slit 220 and dispersing it according to its wavelength and substantially focusing the dispersed light to an image plane 270. By changing the dispersion of the variable dispersion element 230, the spectral resolution of the optical imaging system 200 can be changed such that a decreased dispersion produces a dispersed image with coarser spectral resolution and an increased dispersion produces a dispersed image with a finer spectral resolution.

FIG. 2B illustrates an optical imaging system 300, in accordance with an embodiment of the present teachings. In this embodiment, the embodiment 200 illustrated in FIG. 2A is modified such that the slit 220 is removed from the optical path and the variable dispersing element 330 is switched to its non-dispersing mode, which allows the system to operate in it temporal two-dimensional spatial imaging mode. With the slit 220 removed and the dispersion of the combined gratings removed, the system 300 behaves as a combined imager and a non-dispersive relay lens. In operation, light emitted or reflected by a source located at the object plane is incident on an imager 240. In this embodiment, imager 240, which is incident on an optical relay imager 350. In this embodiment, optical relay imager 350 is the optical relay imager 250 of the embodiment 200 illustrated in FIG. 2A, where the variable dispersing element 330 of the optical relay imager 350 is the variable dispersing element 230 of the optical relay imager 250, whose combined dispersive properties have been modified to be substantially zero. The optical relay imager 350 is capable of substantially receiving a portion of the light emanating from the imager 240 and substantially reimaging the light from the imager 240 and substantially focusing the light to an image plane 270 with substantially no dispersion.

The movement of the slit 220 in optical imaging systems 200 and 300 can be accomplished through any number of means, including but not limited to, a moveable platform, having the platform attached to rails and having a component such as but not limited to a drive motor or screw, that causes the motion of the platform. Alternatively, the slit can be placed into or removed from the optical path through non-mechanical means, such as but not limited to, a liquid-crystal based slit aperture where the transmission properties of the slit can be modified electrically or chemically to extract a line image or to allow a larger field to pass. The movement of the variable dispersing elements 230 and 330 of the optical imaging systems 200 and 300 respectively can be accomplished through any number of means, including but not limited to, a moveable platform, having the platform attached to rails and having a component such as but not limited to a drive motor or screw, that causes the motion of the platform.

In certain cases, it is often desirable for reasons of, for example, size constraints, scanning restrictions, etc., to maintain the sensor in a stationary position while scanning the object or scene.

FIGS. 3A and 3B illustrate optical imaging systems 400 and 500 in accordance with another embodiment of the present teachings. In this embodiment, a novel scanning method is provided where the position of the slit 220 is translated in the direction parallel to the direction of dispersion, taken along the optical axis 210 in the plane parallel to the direction of dispersion. As the slit 220 is translated, the sampling field or extracted line image from the imager 240 is scanned across the object or field, resulting in the image on the detector 270 being shifted, allowing the collection of the scene by moving the slit up and down in predetermined steps.

In one embodiment, the portion of the object scene that is imaged by the sensor is dependent upon the position of the slit aperture 220, and by scanning the slit 220 in a direction parallel to the direction of dispersion from substantially above the optical axis 210 to substantially below the optical axis 210, the scene can be readily scanned without introducing any substantially large scanning components. The resulting dispersed image also scans up and down on the detector 270 and the resulting spectral data can be readily reconstructed in post processing.

Referring to FIG. 3A, the slit 220 of optical imaging system 400 is translated in a direction parallel to the direction of dispersion to a position substantially above the optical axis 210. In operation, light emitted or reflected by a source located at the object plane, is incident on an imager 240. In this embodiment, imager 240 comprises refractive elements 242, 243, 244, 245, and 246, and is capable of substantially receiving a portion of the light from the source and substantially focusing the light onto the slit aperture 220. In this embodiment, slit aperture 220 is capable of substantially receiving the light from the imager 240 and substantially capable of extracting and transmitting a line image.

Light transmitted by the slit element 220 is incident on an optical relay imager 450. In this embodiment, optical relay imager 450 comprises refractive elements 252, 253, 254, 255, 262, 263, 264, and 265 and a dispersing element 430. In one embodiment, dispersing element 430 may be a transmission diffraction grating. The optical relay imager 450 is capable of substantially receiving a portion of the light emanating from the slit 220 and substantially reimaging the light from the slit 220 and dispersing it according to its wavelength and substantially focusing the dispersed light to an image plane 270.

FIG. 3B illustrates an optical imaging system 500, in accordance with an embodiment of the present teachings. In this embodiment, the embodiment 400 illustrated in FIG. 3A is modified such that the slit 220 of optical imaging system 400 is translated in a direction parallel to the direction of dispersion to a position substantially below the optical axis 210. In operation, light emitted or reflected by a source located at the object plane, is incident on the imager 240, which is capable of substantially receiving a portion of the light from the source and substantially focusing the light onto the slit aperture 220. In this embodiment, slit aperture 220 is capable of substantially receiving the light from the imager 240 and substantially capable of extracting and transmitting a line image.

Light transmitted by the slit element 220 is incident on the optical relay imager 450, which is capable of substantially receiving a portion of the light emanating from the slit 220 and substantially reimaging the light from the slit 220 and dispersing it according to its wavelength and substantially focusing the dispersed light to an image plane 270.

The scanning of the slit 220 of the optical imaging systems 400 and 500 can be accomplished through any number of means, including but not limited to, a moveable platform, having the platform attached to rails and having a component such as but not limited to a drive motor or screw, that causes the motion of the platform. Alternatively, the slit can be moved through non-mechanical means, such as but not limited to, a liquid-crystal based slit aperture where the transmission properties of the slit can be modified electrically or chemically to allow a line image to be extracted at various positions within the slit substrate.

As used herein, the singular forms "a," "an," and "the" include the plural reference unless the context clearly dictates otherwise. Except where otherwise indicated, all numbers expressing quantities of ingredients, reaction conditions, and so forth used in the specification and claims are to be understood as being modified in all instances by the term "about."

For the purpose of better describing and defining the present invention, it is noted that terms of degree (e.g., "substantially," "about," and the like) may be used in the specification and/or in the claims. Such terms of degree are utilized herein to represent the inherent degree of uncertainty that may be attributed to any quantitative comparison, value, measurement, and/or other representation. The terms of degree may also be utilized herein to represent the degree by which a quantitative representation may vary (e.g., ±10%) from a stated reference without resulting in a change in the basic function of the subject matter at issue.

Although these teachings have been described with respect to various embodiments, it should be realized these teachings are also capable of a wide variety of further and other embodiments within the spirit and scope of the invention.

What is claimed is:

1. An optical imaging system defining an optical path, comprising:
   a first optical sub-system having at least one optical element, said first optical sub-system being configured to substantially image, at a focus plane, electromagnetic radiation emanating from an object plane;
   at least one slit element substantially located at said focus plane, the at least one slit element being configured to extract a line image from the electromagnetic radiation; wherein said at least one slit element is configured to be movable into and out of the optical path;
   a second optical sub-system having at least one optical element, said second optical sub-system being configured to substantially collimate, at a center plane, electromagnetic radiation emanating from said at least one slit element;

at least one dispersive element substantially located at the center plane, said at least one dispersive element comprises variable dispersive properties; wherein said at least one dispersive element is configured to provide substantially zero dispersion in a first configuration and substantially non-zero dispersion in a second configuration;

a third optical sub-system having at least one optical element, said third optical sub-system being configured to image electromagnetic radiation emanating from the center plane to an image plane; and at least one detecting element located substantially at the image plane;

wherein said optical imaging system is configured to capture two-dimensional imagery of a scene in a first configuration where said at least one slit element is substantially moved out of the optical path and said at least one dispersive element is configured to provide substantially zero dispersion; and wherein said optical imaging system is also configured to capture spectrally dispersed imagery of a scene in a second configuration where said at least one slit element is moved into the optical path and said at least one dispersive element is configured to provide substantially non-zero dispersion.

2. The optical imaging system of claim 1, wherein said at least one dispersive element comprises at least one variable dispersive element.

3. The optical imaging system of claim 2, wherein said at least one dispersive element comprises a pair of counter-rotating transmission gratings.

4. The optical imaging system of claim 2, wherein said at least one dispersive element is configured to provide substantially zero dispersion.

5. The optical imaging system of claim 1, wherein said at least one dispersive element is configured to be movable into and out of the optical path.

6. The optical imaging system of claim 1, wherein said at least one detecting element is substantially centered on the optical path of said third optical sub-system.

7. An optical imaging method, comprising:

imaging electromagnetic radiation from an object plane to an image plane through a slit element of an optical imaging system defining an optical axis, the slit element being substantially located at a focus plane between the object plane and the image plane;

wherein imaging the electromagnetic radiation comprises:

focusing the electromagnetic radiation from the object plane to the slit element at the focus plane;

collimating the line image to a dispersive element at a center plane between the focus plane and the image plane; and focusing the collimated line image from the center plane to the image plane;

said dispersive element being configured to provide substantially non-zero dispersion in a first configuration and substantially zero dispersion in a second configuration;

mechanically translating the slit element along a direction perpendicular to the optical axis so as to scan the object plane;

configuring said optical imaging system to capture two-dimensional imagery of a scene in a second configuration where said slit element is substantially moved out of the optical path and said at least one dispersive element is configured to provide substantially zero dispersion; and detecting electromagnetic radiation emanating from on the image plane.

* * * * *